United States Patent
Park et al.

(10) Patent No.: US 9,459,929 B2
(45) Date of Patent: Oct. 4, 2016

(54) CONFIGURABLE DYNAMIC LOAD SHEDDING METHOD IN DISTRIBUTED STREAM COMPUTING SYSTEM

(71) Applicant: Hong Kong Applied Science and Technology Research Institute Company Limited, Hong Kong (HK)

(72) Inventors: Ji Hyoun Park, Hong Kong (HK); Kangheng Wu, Hong Kong (HK); Zhi Bin Lei, Hong Kong (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 630 days.

(21) Appl. No.: 13/962,971

(22) Filed: Aug. 9, 2013

(65) Prior Publication Data

US 2015/0046506 A1   Feb. 12, 2015

(51) Int. Cl.
*G06F 15/16* (2006.01)
*G06F 9/50* (2006.01)

(52) U.S. Cl.
CPC .................... *G06F 9/5083* (2013.01)

(58) Field of Classification Search
CPC ....... H04L 67/10; H04L 43/04; H04L 43/16; H04L 47/32; G06F 17/30516
USPC ........................................................ 709/232
See application file for complete search history.

(56) References Cited

U.S. PATENT DOCUMENTS

| | | | |
|---|---|---|---|
| 6,826,620 B1 * | 11/2004 | Mawhinney ............ | H04L 47/10 370/235 |
| 6,990,529 B2 * | 1/2006 | Yang ........................ | H04L 47/10 709/232 |
| 2005/0052992 A1 * | 3/2005 | Cloonan ............. | H04L 12/5695 370/229 |
| 2005/0223089 A1 * | 10/2005 | Rhodes ............... | H04L 43/0876 709/223 |
| 2012/0144064 A1 * | 6/2012 | Parker ..................... | H04L 45/04 709/241 |
| 2012/0278463 A1 | 11/2012 | Ryu et al. | |
| 2013/0007223 A1 * | 1/2013 | Luby ................ | H04N 21/23106 709/219 |
| 2013/0031282 A1 | 1/2013 | Amini et al. | |
| 2013/0046901 A1 | 2/2013 | Sabir et al. | |

OTHER PUBLICATIONS

Neumeyer et al., S4: Distributed Stream Computing Platform, Yahoo! Labs, Santa Clara, CA, U.S.A.
Kalyvianaki et al., Overload Management in Data Stream Processing Systems with Latency Guarantees, Dept. of Computing, Imperial College, London, UK.
Wei et al., Utility-driven Load Shedding for XML Stream Processing, Dept. of Computer Science, Worcester Polytechnic Institute, U.S.A.
Tatbul et al., Load Shedding in a Data Stream Manager, Proceedings of the 29th VLDB Conference, 2003, Berlin, Germany.
Marz, Storm Distributed and Fault-tolerant Realtime Computation, Twitter.

* cited by examiner

*Primary Examiner* — Phuoc Nguyen
(74) *Attorney, Agent, or Firm* — Ella Cheong Hong Kong; Sam T. Yip

(57) ABSTRACT

A computer implemented method of load shedding used in stream computing system that considers the relative importance of each of the applications processing the incoming input data or events. The method of load shedding method also accounts for system physical constraints, such as memories and CPU utilization. The load shedding method first observes the workload of each application and arriving rate of the incoming input data or events. If the system is under an overloading condition, calculate a input data or event drop ratio for each application such that the projected sum of all applications' workload will be at or below the system capacity when the unprocessed input data or events are dropped according to the drop ratio for each application.

16 Claims, 2 Drawing Sheets

CONFIGURABLE DYNAMIC LOAD SHEDDING METHOD IN DISTRIBUTED STREAM COMPUTING SYSTEM

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to information systems used in distributed stream computing. Particularly, the present invention relates to overload management in distributed stream computing systems. Still more specifically, the present invention relates to load shredding methods in distributed stream computing systems.

BACKGROUND

Stream computing is about producing a continuous stream of fresh computational results as new data or events are being input in real-time. Resource provisioning and allocation are particularly difficult due to the time-varying and sporadic nature of the occurrence of new data or events that induces unknown resource demands over time. Under overload condition in which the arriving rate of new data or event exceeds the capacity of the system, the system lacks the resources to process the new incoming data or events within a tolerable time period. Consequently the processing latency grows uncontrollably, compromising the freshness of the stream of computational results.

Computing architectures and techniques have been developed to address the abovementioned problem. One such architecture is to divide computational resources into physical or logical units (nodes) for processing the input data or events, and distribute the incoming input data or events to the nodes according to a distribution scheme. The distribution scheme can be as simple as round robin or as complex as intelligent distribution based on constantly monitored load levels of the nodes. The advantage of such architecture is that computational processing can be distributed and performed in parallel, and physical/logical units of computational resources can be added or removed according to the actual runtime load levels, thus achieving scalability. One example of such distributed stream computing systems is described in the document: Neumeyer et al., *S4: Distributed Stream Computing Platform*, Santa Clara, Calif., U.S.A., 2010; the content of which is incorporated herein by reference in its entirety.

Load shedding is a computing technique that discards some fraction of unprocessed input data or events in order to reduce the system load, in turn reduces the observable latency of the stream of computational results. One issue with load shedding is how to most efficiently discard unprocessed input data or events and yet ensuring the deviations from the perfect computing results are minimized.

One of the load shedding strategies is to eliminate the incoming input data or events once the system resource capacity is reach; for example, when a buffer for holding input data or events to be processed is full. However, this strategy treats all input data or events in-discriminatively and does not account for the difference in importance of the input data or events. This leads to unpredictable or poor accuracy in the computational results. In addition, the rate of data or event elimination cannot be adjusted for varying input data or event arriving rate and observable processing latency during runtime.

Another load shedding strategy is to continuously monitor the actual processing latency and/or resource (such as CPU and memories) utilization, compare with a pre-determined optimal processing latency and/or resource utilization rate, and discard randomly selected unprocessed input data or events based on the differences between the actual and optimal processing latencies and/or resource utilization rates. One example of this strategy is described in the document: Kalyvianaki et al., *Overload Management in Data Stream Processing Systems with Latency Guarantees*, Stockholm, Sweden, 2012; the content of which is incorporated herein by reference in its entirety. This strategy, however, suffers the same problem of unpredictable or poor accuracy in the computing results.

Some other load shedding strategies require the system to have active knowledge of the usage of the input data. The usage can be in the form of data queries of the input data specified by a user. The decisions of when and what to discard rely on the analysis of these queries in order to determine the different levels of importance of the input data. Runtime control of the discard decisions can be achieved by specially designed queries. For example, the U.S. Patent Application Publication No. 2012/027,843 discloses a method of controlling load shedding for excluding data streams of a data process input into a data stream management system.

Another example of one such load shedding strategy applies XML query processing on input data and makes discard decisions based on patterns of XML data structures. The details of this example is disclosed in the document: Wei et al., *Utility-driven Load Shedding for XML Stream Processing*, Worcester Polytechnic Institute, U.S.A., 2003; the content of which is incorporated herein by reference in its entirety. The downside of these load shedding strategies, however, is that they are not flexible, and highly application and data specific.

SUMMARY

It is an objective of the presently claimed invention to provide a method of load shedding used in distributed stream computing systems that is efficient, optimal, flexible, and balanced between computing result accuracy and processing latency.

It is a further objective to provide such method of load shedding that considers the relative importance of each of the applications processing the incoming input data or events. The presently claimed method of load shedding also accounts for system physical constraints, such as memories and CPU utilization. The load shedding method first observes the workload of each application and arriving rate of the incoming input data or events. If the system is under an overloading condition, calculate a input data or event drop ratio for each application such that the projected sum of all applications' workload will be at or below the system capacity when the unprocessed input data or events are dropped according to the drop ratio for each application.

BRIEF DESCRIPTION OF THE DRAWINGS

Embodiments of the invention are described in more detail hereinafter with reference to the drawings, in which.

DETAILED DESCRIPTION

Figure 1:
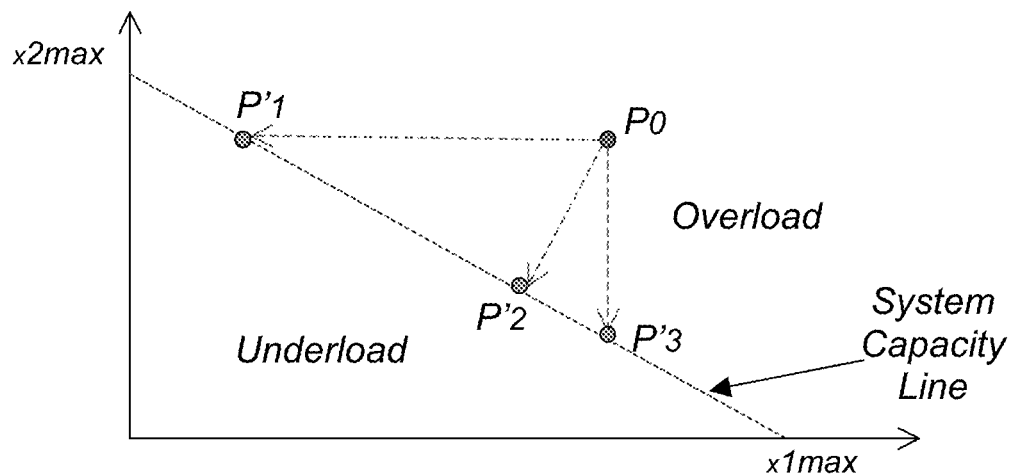
FIG. 1 shows, in a 2-dimensional space, the system capacity line of an exemplary distributed stream computing system having two applications, a current system load under an overloading condition, and three target projection points as aids in illustrating the presently claimed loading shedding method.

In the following description, load shedding methods and systems used in distributed stream computing systems and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In accordance to various embodiments, the load shedding method approaches the problem of how much and which input data or events to drop by first defining an architecture of distributed stream computing system where a plurality of applications are deployed in one or more physical computing processing units with each including all necessary computing resources such as CPUs and memories, virtual partitions of computing processing units, or logical computing processing units (collectively referred to as "nodes").

Each node is running one or more instances of the applications. An application running in one or more nodes is denoted by $App_i$. The application $App_i$ requires a certain amount of computing resources, denoted by $C_i$, of the nodes to process an incoming input data or event. The arriving rate of the incoming input data or events to be processed by $App_i$ is the number of incoming input data or events which arrive in a unit of time, denoted by $\lambda_i$. The required workload of the application $App_i$ for processing the input data or event in runtime is then $(\lambda_i * C_i)$. The actual processing rate of the input data or events being processed by $App_i$ is the number of input data or events processed in a unit of time, denoted by $x_i$. The load shedding percentage of input data or events is then $p_i=(\lambda_i-x_i)/\lambda_i$. The computing capacity of a node is denoted by $M_j$. Therefore, a foreseeable overloading condition can be defined as $Sum_i(\lambda_i * C_i) > Sum_j(M_j)$. In other words, when the sum of required workload of all applications exceeds the sum of all nodes' computing capacities, an overloading condition occurs.

When the distributed stream computing system is running at maximum capacity, the sum of all applications' actual workloads equals to the sum of all nodes' computing capacities. This can be mathematically represented by $Sum_i(x_i * C_i) = Sum_j(M_j)$ or $Sum_i(x_i * C_i) - Sum_j(M_j) = 0$. Mathematically, $Sum_i(x_i * C_i) - Sum_j(M_j) = 0$ is a hyper-plane (referred to as "system capacity line"); along with the minimum boundary condition point: $x_i=0$, they form a bounded multi-dimensional shape in a multi-dimensional space. Let $P(x_1, x_2, x_3, \ldots x_N)$ be a point in the multi-dimensional space and represents the current system load with all the applications running. When $P(x_1, x_2, x_3, \ldots x_N)$ is located on the system capacity line, the sum of all applications' actual workloads equals to the sum of all nodes' computing capacities. When $P(x_1, x_2, x_3, \ldots x_N)$ is located within the multi-dimensional shape bounded by the $Sum_i(x_i * C_i) - Sum_j(M_j)=0$ hyper-plane and the $x_i=0$ point (below system capacity line), the sum of all applications' actual workloads is below the sum of all nodes' computing capacities, an under-loading condition is occurring. When $P(x_1, x_2, x_3, \ldots x_N)$ is located outside of the bounded multi-dimensional shape (above system capacity line), the sum of all applications' actual workloads is above the sum of all nodes' computing capacities, an overloading condition is occurring. In order to reduce the actual average processing latency to equal or below the user-acceptable average processing latency, the load shedding module is to drop certain input data or events, and by doing so bring the system load to a target projection point on or below the system capacity line.

FIG. 1 shows, in a 2-dimensional space, the system capacity line of an exemplary distributed stream computing system having two applications: $App_1$ and $App_2$ experiencing an overloading condition. In this 2-dimensional space, a current system load, $P_0$, is located above the system capacity line; three target projection points of system load, $P'_1$, $P'_2$, and $P'_3$ are identified. $P'_1$ is achieved by dropping input data or events to be processed by $App_1$, $P'_3$ is achieved by dropping input data or events to be processed by $App_2$, and $P'_2$ is achieved by dropping input data or events to be processed by $App_1$ and $App_2$. $P'_2$ is the optimal target projection point as the least number of input data or events will be dropped for each of $App_1$ and $App_2$, hence least impacting the computational result accuracy of both applications. The following shows the mathematical calculation of $P'_2$:

System capacity line=$C_1*x_1+C_2*x_2-Sum_j(M_j)=0$

For $P_0(x_1[0], x_2[0])$, $P'_2(x_1[2], x_2[2])=(x_1[0]-C_1*(C_1*x_1[0]+C_2*x_2[0]-Sum_j(M_j))/(C_1\hat{}2+C_2\hat{}2),$ $x_2[0]-C_2*(C_1*x_1[0]+C_2*x_2[0]-Sum_j(M_j))/(C_1\hat{}2+C_2\hat{}2)$ It can be assumed that at the initial overloading condition and before load shedding begins, the applications' process rates, $x_1[0]$ and $x_2[0]$, at the current system load, $P_0$, are the input data or event arriving rates, $\lambda_1$ and $\lambda_2$ respectively.

To generalize, for a current system load, $P(x_1, x_2, x_3, \ldots x_N)$, the optimal target projection point, $P'(x'_1, x'_2, x'_3, \ldots x'_N)$, can be calculated as:

$x'_i = x_i - C_i*(Sum_i(C_i*x_i) - Sum_j(M_j))/Sum_i(C_i\hat{}2).$

The load shedding percentage of incoming input data or events, or drop ratio, for each application is:

$p_i=(x_i-x'_i)/x_i$ or $(\lambda_i-x'_i)/\lambda_i$ for $x_i=\lambda_i$.

Figure 2:
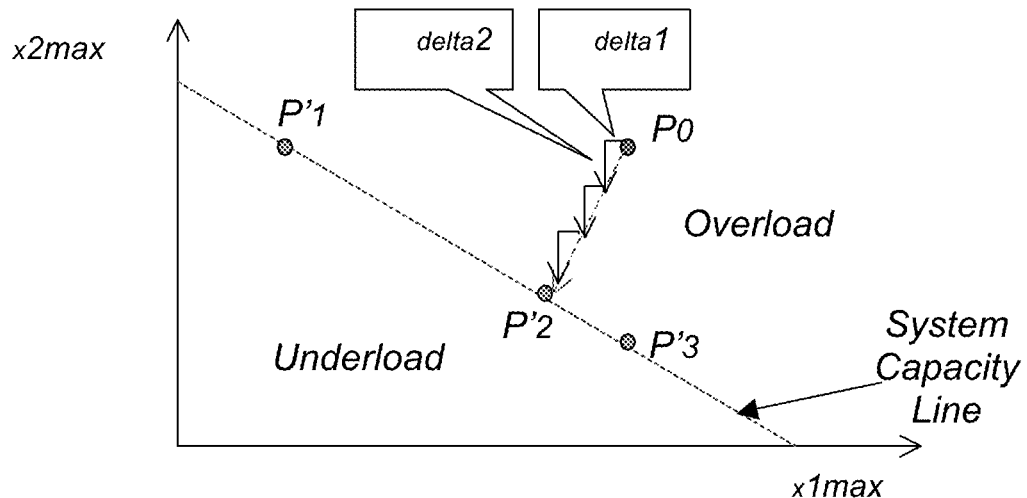
FIG. 2 further shows the current system load being moved towards the target projection point in incremental steps.

In order to minimize the negative effect on the computational result accuracy of the applications, incoming input data or events are dropped incrementally according to an increasing load shedding percentage calculated for each application. The calculation takes into consideration the available buffer for each application to hold unprocessed incoming input data or events. Referring to FIG. 2. The current system load, $P_0$, is being moved towards the target projection point, $P'_2$, in steps due to the incoming input data or events to be processed by $App_1$ and $App_2$ being dropped using load shedding percentage that increase in $n_1$ and $n_2$ steps of sizes:

$delta_1 = (\lambda_1 - x'_1)/(n_1 * \lambda_1)$ and $delta_2 = (\lambda_2 - x'_2)/(n_2 * \lambda_2)$ respectively.

To generalize, the incremental drop ratio delta is: $(\lambda_i - x'_i)/(n_i * \lambda_i)$; where $n_i$ is a number proportional to the available buffer in $App_i$ for holding unprocessed incoming input data or events.

Taking the relative importance of the application into additional consideration, the system capacity line is modified to be:

$Sum_i(x_i * s_i * C_i) - Sum_j(M_j) = 0$, where $s_i$ is the relative importance coefficient of $App_i$.

The incremental drop ratio delta is then modified to be: $(\lambda_i - x'_i)/(n_i * \lambda_i * s_i)$.

The relative importance coefficient can be pre-configured, dynamically adjusted, and updated in runtime based on conditions of the applications and the distributed stream computing system. For example, to increase the computational result accuracy of an application, its corresponding relative importance coefficient value can be made larger.

Assuming the occurrence pattern of incoming input data or events follows a random Gaussian distribution. Further assuming that the arriving rates, $(\lambda_1, \lambda_2, \lambda_3, \ldots \lambda_N)$, take the mean values with a standard deviation of r. The current system load, P, becomes the center point of a shape in the multi-dimensional space having a volume proportional to r. Inside this shape are all the probable current system load values. To compensate for some of probable current system loads that are higher than P, the target projection point of system load, P', must be set somewhere below the system capacity line to ensure system stability with guaranteed probability of buffer overflow control. For example, if P' is set at a distance of 1×r below the system capacity line, there is 68% confidence that the buffers will not overflow; 2×r for 95% confidence; and 3×r for 99.7% confidence.

Figure 3:
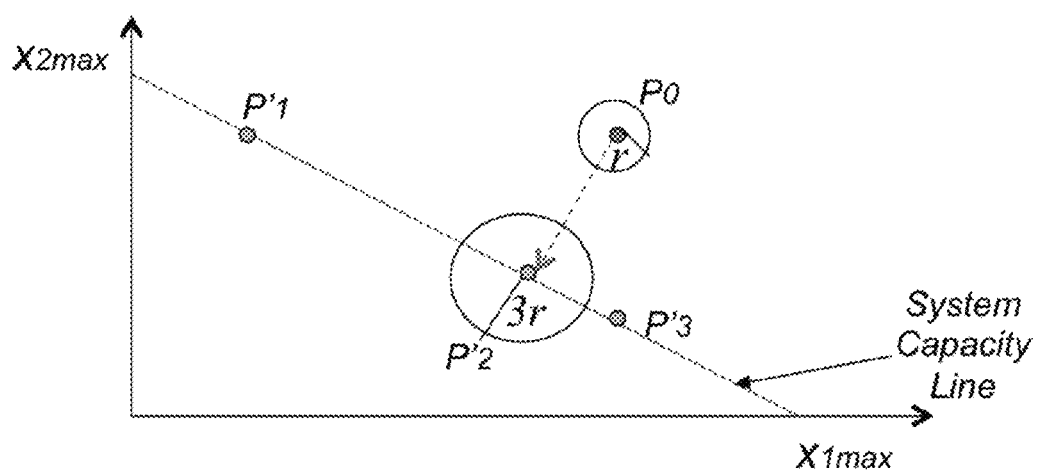
FIG. 3 further shows a revised target projection point for system stability with guaranteed probability of buffer overflow control.

Referring to FIG. 3. The current system load, $P_0$, is the center of a circle having a radius of r. The circle area contains all the probable current system load values. To ensure system stability with 99.7% confidence that the buffers will not overflow, the target projection point of system load, $P'_2$, is set at 3×r below the system capacity line.

In accordance to various embodiments, a load shedding module implementing the method of the present claimed invention monitors the processing latencies of the nodes and if any one node is exhibiting an observed latency that is greater than a pre-defined user acceptable latency value, the load shedding module computes the target projection point of system load, a drop ratio, and an incremental drop ratio delta for each of the applications running in the distributed stream computing system. The target projection point can optionally be revised according to guaranteed probability of buffer overflow control requirements and a revised drop ratio and incremental drop ratio delta for each of the applications are determined. Each application drops its unprocessed input data or events by a load shedding percentage that is equal to its corresponding incremental drop ratio delta initially and increments by the same delta for each cycle until the observed average latency at each nodes is not greater than the pre-defined user acceptable latency value.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. computer implemented method for load shedding in a distributed stream computing system, comprising:
    detecting a processing latency;
    calculating a target projection point for system load;
    if the processing latency is greater than a latency threshold:
        calculating a drop ratio for each of one or more applications running in the system based on one or more drop ratio computation factors comprising:
            the target projection point for system load,
            arriving rate of data or events,
            processing rate of data or events,
            amount of system resources for processing data or events, and
            system resource capacity;
        determining an incremental drop ratio delta for each of the one or more applications, wherein the incremental drop ratio delta is the drop ratio for the corresponding application divided by a number, the number for dividing the drop ratio being proportional to available buffer in the corresponding application for holding unprocessed input data or events;
        determining a load shedding percentage for each of the one or more applications;
        dropping a fraction of unprocessed data or events by the load shedding percentage for each of the one or more applications;
    repeating the determining of the load shedding percentage and the dropping of the fraction of unprocessed data or event for each of the one or more applications until the processing latency is not greater than the latency threshold, wherein the load shedding percentage is initially equal to the incremental drop ratio delta for the corresponding application and increments by the same delta for each cycle.

2. The method of claim 1, wherein the load shedding percentage is constrained by and proportional to available buffer in the corresponding application for holding unprocessed input data or events.

3. The method of claim 1, wherein the drop ratio computation factors further comprising a relative importance of each of the one or more applications running in the system.

4. The method of claim 3, wherein computational result accuracy of the application is changed by adjusting the relative importance of the corresponding application.

5. The method of claim 1, wherein the target projection point for system load is calculated to be a projection point on a system capacity line of the system such that the system resources are utilized at maximum under constraints of the one or more configuration parameters.

6. The method of claim 1, wherein the target projection point for system load is calculated to be a projection point at a distance below a system capacity line of the system according to a guaranteed probability of buffer overflow control requirement.

7. The method of claim 1, wherein the processing latency being the average of one or more process latencies observed for a certain period of time at one or more nodes in the system.

8. The method of claim 1, wherein the processing latency being the minimum of one or more process latencies observed at one or more nodes in the system.

9. distributed stream computing system comprising one or more nodes, the one or more nodes being configured to execute a process comprising:
   detecting a processing latency;
   calculating a target projection point for system load;
   if the processing latency is greater than a latency threshold:
      calculating a drop ratio for each of one or more applications running in the system based on one or more drop ratio computation factors comprising:
         the target projection point for system load,
         arriving rate of data or events,
         processing rate of data or events,
         amount of system resources for processing data or events, and
         system resource capacity;
      determining an incremental drop ratio delta for each of the one or more applications, wherein the incremental drop ratio delta is the drop ratio for the corresponding application divided by a number, the number for dividing the drop ratio being proportional to available buffer in the corresponding application for holding unprocessed input data or events;
      determining a load shedding percentage for each of the one or more applications;
      dropping a fraction of unprocessed data or events by the load shedding percentage for each of the one or more applications;
      repeating the determining of the load shedding percentage and the dropping of the fraction of unprocessed data or event for each of the one or more applications until the processing latency is not greater than the latency threshold, wherein the load shedding percentage is initially equal to the incremental drop ratio delta for the corresponding application and increments by the same delta for each cycle.

10. The distributed stream computing system of claim 9, wherein the load shedding percentage is constrained by and proportional to available buffer in the corresponding application for holding unprocessed input data or events.

11. The distributed stream computing system of claim 9, wherein the drop ratio computation factors further comprising a relative importance of each of the one or more applications running in the system.

12. The distributed stream computing system of claim 11, wherein computational result accuracy of the application is changed by adjusting the relative importance of the corresponding application.

13. The distributed stream computing system of claim 9, wherein the target projection point for system load is calculated to be a projection point on a system capacity line of the system such that the system resources are utilized at maximum under constraints of the one or more configuration parameters.

14. The distributed stream computing system of claim 9, wherein the target projection point for system load is calculated to be a projection point at a distance below a system capacity line of the system according to a guaranteed probability of buffer overflow control requirement.

15. The distributed stream computing system of claim 9, wherein the processing latency being the average of one or more process latencies observed for a certain period of time at the one or more nodes.

16. The distributed stream computing system of claim 9, wherein the processing latency being the minimum of one or more process latencies observed at the one or more nodes.

* * * * *